(12) United States Patent
Yabuya et al.

(10) Patent No.: US 10,085,525 B2
(45) Date of Patent: Oct. 2, 2018

(54) SLIDER FOR SLIDE FASTENER

(71) Applicant: YKK Corporation, Tokyo (JP)

(72) Inventors: Toru Yabuya, Toyama (JP); Keiichi Keyaki, Toyama (JP); Hisanori Kato, Tokyo (JP); Tomoko Taguchi, Tokyo (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 15/371,438

(22) Filed: Dec. 7, 2016

(65) Prior Publication Data

US 2017/0164696 A1 Jun. 15, 2017

(30) Foreign Application Priority Data

Dec. 15, 2015 (JP) .................. 2015-244464

(51) Int. Cl.
| | |
|---|---|
| *A44B 19/26* | (2006.01) |
| *C04B 35/636* | (2006.01) |
| *C04B 35/638* | (2006.01) |
| *C04B 35/48* | (2006.01) |
| *C04B 35/634* | (2006.01) |
| *C04B 35/64* | (2006.01) |
| *C04B 37/00* | (2006.01) |
| *B28B 1/24* | (2006.01) |

(52) U.S. Cl.
CPC ............ *A44B 19/262* (2013.01); *C04B 35/48* (2013.01); *C04B 35/638* (2013.01); *C04B 35/6365* (2013.01); *C04B 35/63416* (2013.01); *C04B 35/64* (2013.01); *C04B 37/008* (2013.01); *B28B 1/24* (2013.01); *C04B 2235/3244* (2013.01); *C04B 2235/6022* (2013.01); *C04B 2235/6567* (2013.01); *C04B 2235/762* (2013.01); *C04B 2237/348* (2013.01); *C04B 2237/76* (2013.01)

(58) Field of Classification Search
CPC ....... A44B 19/24; A44B 19/26; A44B 19/262; A44B 19/42; Y10T 24/2561; Y10T 24/2586; Y10T 24/2588
See application file for complete search history.

(56) References Cited

U.S. PATENT DOCUMENTS

| | | | | |
|---|---|---|---|---|
| 3,239,905 | A * | 3/1966 | Weiner ................. | A44B 19/306 24/421 |
| 5,195,221 | A * | 3/1993 | Kanamaru ............ | A44B 19/26 24/419 |
| 5,621,954 | A * | 4/1997 | Mizuno ................. | A44B 19/26 24/387 |
| 5,729,874 | A * | 3/1998 | Mizuno ................ | A44B 19/308 24/429 |

(Continued)

FOREIGN PATENT DOCUMENTS

CN 101579160 A 11/2009

*Primary Examiner* — Robert Sandy
*Assistant Examiner* — Rowland Do
(74) *Attorney, Agent, or Firm* — Kilpatrick Townsend & Stockton LLP

(57) ABSTRACT

Provided is a slider having appearance or texture which cannot be obtained with a slider body made of metal or synthetic resin in the related art and further having properties superior than those of sliders in the related art. A slider of an embodiment of the invention includes a slider body formed by sintered bodies containing zirconium oxide as a main component and a tab held by a tab attaching portion of the slider body.

11 Claims, 13 Drawing Sheets

(56) References Cited

U.S. PATENT DOCUMENTS

| | | | | |
|---|---|---|---|---|
| 6,332,249 | B1* | 12/2001 | Oda | A44B 19/303 24/420 |
| 6,490,770 | B1* | 12/2002 | Matsuda | A44B 19/26 24/415 |
| 7,089,632 | B2* | 8/2006 | Keyaki | A44B 19/26 24/429 |
| 8,056,194 | B2* | 11/2011 | Miyazaki | A44B 19/26 24/387 |
| 2003/0154578 | A1* | 8/2003 | Tenjin | A44B 19/26 24/430 |
| 2015/0265006 | A1* | 9/2015 | Weller | A41F 1/02 24/388 |

\* cited by examiner

FIG.9
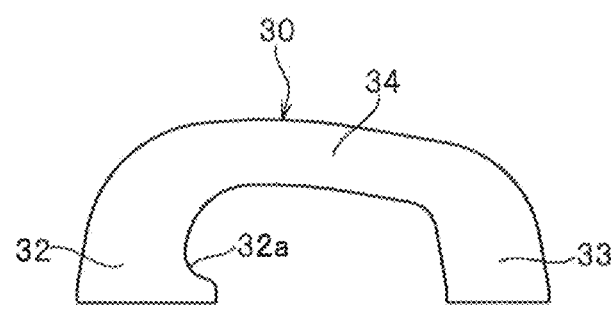
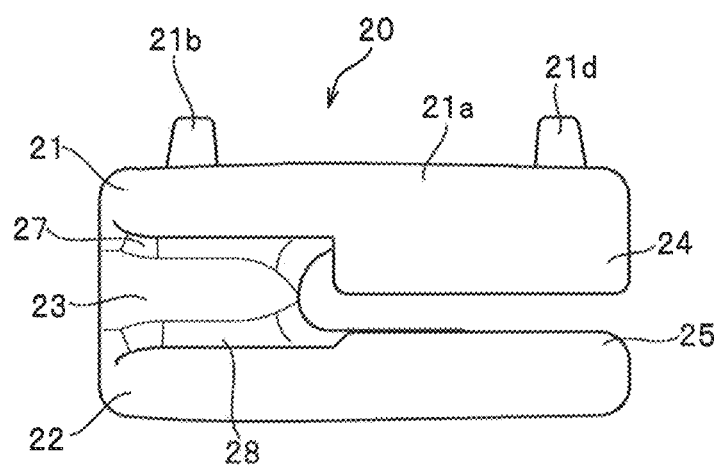

SLIDER FOR SLIDE FASTENER

The present application claims priority to Japanese Patent Application No. 2015-244464, filed on Dec. 15, 2015 and entitled "Slider for Slide Fastener," the entire contents of which are hereby incorporated by reference.

TECHNICAL FIELD

The invention relates to a slider used in a slide fastener.

BACKGROUND ART

In the related art, slide fasteners are used while attached to an opening of articles such as garments or bags (product attached with a slide fastener). Sliding the slider attached to the slide fastener along element rows allows for separating or coupling the element rows on the right and left, thereby opening or closing the opening of the article.

Generally, sliders used in slide fasteners include a slider body where an upper blade plate and a lower blade plate are connected by a guidepost and a tab rotatably held with respect to the slider body. An element guiding path of substantially a Y-letter shape to guide the element rows on the right and left is formed between the upper blade plate and the lower blade plate of the slider body.

Materials of slider bodies as described above include, generally, metals and synthetic resins. For example a slider body made of metal is formed by die casting molding of a metal material such as zinc alloy or aluminum alloy or by press working of copper alloy such as brass or stainless steel. A slider body made of synthetic resin is formed by injection molding of thermoplastic resin, such as polyamide, polyacetal, polypropylene, and polybutylene terephtalate into a predetermined shape.

The specification of Chinese Patent Publication No. 101579160 (Patent Document 1) discloses a slider, made of stainless steel, formed by metal injection molding. In metal injection molding (MIM), generally, fine powder of stainless steel and a binder of synthetic resin are mixed well to produce a metal raw material. The obtained metal raw material is subjected to injection molding and thereby produces a molded article called a green body. Thereafter, the obtained green body is placed inside a sintering furnace and degreasing and sintering are performed. This results in manufacturing of a product made of stainless steel.

Patent Document 1 describes that manufacturing of the slider made of stainless steel using metal injection molding is suitable for manufacturing of a slider of a desirable size and also has advantages of reducing waste and enhancing product performance. Other advantages described include cleaner surfaces, no bubbles generated, no oxidation, and no post-processing or auxiliary devices required.

CITATION LIST

Patent Document

Patent Document 1: CN 101579160 A

SUMMARY OF THE INVENTION

Technical Problem

Slide fasteners are used in various products such as garments or bags. Sliders used in slide fasteners are often exposed outside such products and thus there are cases where appearance (design), touch, texture, or other features of the slider itself is important. Sliders in the related art, however, the slider body is generally made of metal or synthetic resin as described above and thus the shape of the slider body is limited to some extent in order to stably secure functions of a slider.

In recent years, slide fasteners or sliders used in the slide fasteners are desired to have features different from those in the related art or to have new preferable appearance or texture in order to meet diverse needs of consumers or to differentiate the slide fasteners or the sliders from other products. There are also cases where sophisticated sliders are preferably used in order to further enhance an added value as products become to have higher quality or gain further functions.

The invention has been devised in consideration to the aforementioned problems in the related art. A specific object of the invention is to provide a slider having appearance or texture which cannot be obtained with a slider body made of metal or synthetic resin in the related art and further having properties superior than those of sliders in the related art while essential functions of a slider are stably secured.

To achieve the above object, one of the main characteristics of a slider for a slide fastener provided by the invention is that the slider includes, as a basic configuration: a slider body where an upper blade plate and a lower blade plate are connected by a guide post and a tab attaching portion is disposed on a top surface of the upper blade plate; and a tab held by the tab attaching portion, being characterized in that the slider body is formed by a sintered body containing zirconium oxide as a main component.

In the slider according to an embodiment of the invention, it is preferable that the slider body includes a first sintered member including the upper blade plate, the lower blade plate, and the guide post and a second sintered member which forms the tab attaching portion and is formed separately from the first sintered member, and the second sintered member is fixed to the first sintered member via an adhesive agent.

Further, in the slider according to an embodiment of the invention, it is preferable that the second sintered member includes a first attaching post portion fixed to a shoulder opening side on a top surface of the upper blade plate, a second attaching post portion fixed to a rear opening side on the top surface of the upper blade plate, and a bridging portion bridged between upper end portions of the first and the second attaching post portions, the upper blade plate includes a first protruding portion protruding from an end portion on the shoulder opening side on the top surface of the upper blade plate and a second protruding portion protruding from an end portion on the rear opening side on the top surface of the upper blade plate, and the second sintered member includes a first fitting hole portion to fit the first protruding portion therein, the first fitting hole portion being included on a lower surface of the first attaching post portion in a recessed manner, and a second fitting hole portion to fit the second protruding portion therein, the second fitting hole portion being included on a lower surface of the second attaching post portion in a recessed manner.

In this case, it is preferable that at least a part of a periphery of the first protruding portion on the top surface of the upper blade plate includes, in a recessed manner, a first recessed portion to fit a lower end portion of the first attaching post portion therein and at least a part of a periphery of the second protruding portion includes a second recessed portion to fit a lower end portion of the second attaching post portion therein. Further preferably, the first recessed portion and the second recessed portion are included around the entire peripheries of the first protruding portion and the second protruding portion, respectively, in a continued manner.

Further, it is preferable that the lower end portion of the first attaching post portion is formed such that a length in a longitudinal direction from a rear end of the first fitting hole portion to a rear edge of the first attaching post portion is longer than a length in a longitudinal direction from a front end of the first fitting hole portion to a front edge of the first attaching post portion. In the invention, it is preferable that the first recessed portion is extended to an edge on the shoulder opening side of the upper blade plate and opened at the edge on the shoulder opening side of the upper blade plate and that the second recessed portion is extended to an edge on the rear opening side of the upper blade plate and opened at the edge on the rear opening side of the upper blade plate.

It is also preferable that the first protruding portion of the upper blade plate includes at least one recessed groove portion recessed in a part of an outer peripheral surface of the first protruding portion and that the second protruding portion of the upper blade plate includes at least one recessed groove portion recessed in a part of an outer peripheral surface of the second protruding portion. It is especially preferable that the recessed groove portion of the first protruding portion is disposed in parallel or inclined with respect to the top surface of the upper blade plate and that the recessed groove portion of the second protruding portion is disposed in parallel or inclined with respect to the top surface of the upper blade plate.

Further, it is preferable that an outer surface of the second sintered member, exposed outside has a polished surface subjected to polishing processing while inner wall surfaces of the first and the second fitting hole portions of the second sintered member has an unpolished surface having surface roughness greater than that of the polished surface.

Further, it is preferable that a height of the first attaching post portion of the second sintered member from the upper blade plate is higher than a height of the second attaching post portion from the upper blade plate, and the bridging portion is inclined upward toward the first attaching post portion with respect to the top surface of the upper blade plate.

In the slider according to an embodiment of the invention, it is preferable that an upper base portion of the guide post connecting with the upper blade plate is provided with an upper blade side bulging portion connecting, by a curved surface curving in a concave manner, the peripheral surface of the guide post and an element guiding surface of the upper blade plate, and a lower base portion of the guide post coupling with the lower blade plate is provided with a lower blade side bulging portion connecting, by a curved surface curving in a concave manner, the peripheral surface of the guide post and an element guiding surface of the lower blade plate.

Further, in the slider according to an embodiment of the invention, it is preferable that a tab pulling strength when the tab is pulled in a direction perpendicular to the top surface of the upper blade plate is 120 N or more and a tab twisting strength when the tab is held perpendicular to the top surface of the upper blade plate and thereby twisted is 70 N·cm or more.

The slider according to an embodiment of the invention includes a slider body disposed of a tab attaching portion on a top surface of an upper blade plate and a tab rotatably held by the tab attaching portion. The slider body is formed by ceramic sintered bodies containing zirconium oxide (zirconium dioxide $ZrO_2$: hereinafter referred to as zirconia) as a main component. Here, "containing zirconium oxide as a main component" means that zirconium oxide is contained in the sintered body by a ratio larger than 50% cubic volume. In the invention, it is further preferable that zirconium oxide is contained by a ratio of 80% cubic volume or more in order to secure quality as a slider.

In the related art, ceramic sintered bodies, obtained by molding ceramic materials such as metal oxides and further hardening the materials with heat, have higher hardness and superior antifriction properties as compared to metals, for example, but are less shock-resistant and are prone to brittle fracture. It is known that ceramic sintered bodies are prone to breakage or fracture caused by an impact of an object colliding therewith.

Meanwhile with the slider body of a slider, sliding motion of sliding along element rows of a slide fastener by being pulled via the tab is repeated upon use of the slide fastener. The slider body is likely to receive external force from the tab or the element rows upon sliding along the element rows. The slider may be directly collided with other articles since the slider is often disposed exposed outside.

Therefore, the aforementioned ceramic sintered bodies prone to brittle fracture are considered as not suitable as a material of the slider body and thus have not been in use. The present inventors, however, have focused on zirconia among ceramic materials that has not been selected as a material for a slider in the related art and pursued possibilities of applying zirconia as a material for a slider by repeated keen experiments and examinations and have finally completed the invention.

Zirconia has higher fracture toughness and higher bending strength as compared to oxides such as alumina ($Al_2O_3$) or other ceramic materials such as silicon nitride ($Si_3N_4$). Therefore, sintered bodies of molded and sintered zirconia are unlikely to fracture upon receiving external power as compared to other ceramic materials and thus have superior shock-resisting properties.

In the slider of an embodiment of the invention including the slider body, containing zirconia having such high fracture toughness as a main component and formed by a finely sintered body, an element guiding path of substantially a Y-letter shape is formed between an upper blade plate and a lower blade plate of the slider body. Therefore, the slider stably has its essential functions to smoothly separate or couple the element rows on the left and right and appropriately has strength or shock-resisting properties to withstand normal use of slide fasteners.

When the slider of an embodiment of the invention is used in a slide fastener, therefore, even when sliding motion of pulling the tab is repeated or the slider is collided with other articles, the slider body is not easily broken or fractured. Opening and closing motions of the slide fastener by sliding the slider can be thus performed repeatedly.

Moreover, the slider body of an embodiment of the invention is formed by a sintered body containing zirconia as a main component and thus stably has gloss or luster unique to zirconia sintered bodies which cannot be obtained with slider bodies made of metal or slider bodies made of synthetic resin of the related art. The slider body of the embodiment of the invention therefore allows for easily obtaining sophisticated appearance or texture, thereby allowing for clearly differentiating from sliders of the related art.

The slider body formed by the zirconia sintered bodies as described above is superior in terms of antifriction properties, durability, and heat resistance as compared to slider bodies made of metal or slider bodies made of synthetic resin of the related art. Meanwhile, a surface of such a slider body is formed to be hard and smooth and thus using the slider of the embodiment of the invention in a slide fastener allows for suppressing friction resistance of the slider with respect to the element rows, thereby enhancing slidability of the slider.

In such a slider of the embodiment of the invention, the slider body includes the first sintered member including the upper blade plate, the lower blade plate, and the guide post and the second sintered member forming the tab attaching portion and formed separately from the first sintered member. The second sintered member is fixed to the first sintered member via an adhesive agent.

The slider body of the embodiment of the invention formed by fixing the first sintered member and the second sintered member as described above to each other via the adhesive agent allows for easily producing the slider body where the tab attaching portion is disposed on the top surface of the upper blade plate. As the tab to be held by the slider body of the embodiment of the invention, a tab having a general shape or a form used in a slider of the related art can be used, which enhances versatility of tabs.

In this case, the second sintered member includes a first attaching post portion fixed to a shoulder opening side on the top surface of the upper blade plate, a second attaching post portion fixed to a rear opening side on the top surface of the upper blade plate, and a bridging portion bridged between upper end portions of the first and the second attaching post portions. The second sintered member overall has agate-like form. The upper blade plate of the first sintered member includes a first protruding portion protruding from an end portion on the shoulder opening side on the top surface of the upper blade plate and a second protruding portion protruding from an end portion on the rear opening side on the top surface of the upper blade plate. In the second sintered member, a lower surface of the first attaching post portion includes, in a recessed manner, a first fitting hole portion to fit the first protruding portion of the first sintered member therein and to be covered therewith while a lower surface of the second attaching post portion includes, in a recessed manner, a second fitting hole portion to fit the second protruding portion of the first sintered member therein and to be covered therewith.

Since the first and the second sintered members of the slider body are formed in the above manner, positioning of the second sintered member with respect to the first sintered member can be performed easily and stably when the second sintered member is bonded to the first sintered member in a manufacturing process of the slider body, thereby allowing the second sintered member to be steadily fixed to a predetermined position in the first sintered member. Furthermore, since a large bonded area of the first sintered member and the second sintered member can be secured, adhesion strength of the both members can be effectively enhanced. Fitting the first and the second protruding portions into the first and the second fitting hole portions, respectively, allows for effectively preventing the bonded second sintered member from being unstable with respect to the first sintered member.

At least a part of a periphery of the first protruding portion on the top surface of the upper blade plate further includes, in a recessed manner, a first recessed portion to fit a lower end portion of the first attaching post portion therein and at least a part of a periphery of the second protruding portion includes, in a recessed manner, a second recessed portion to fit a lower end portion of the second attaching post portion therein. In this case, it is preferable that the first and the second recessed portions are included around the entire peripheries of the first protruding portion and the second protruding portion, respectively, in a continued manner. With the first and the second recessed portions included in this manner, positioning of the second sintered member with respect to the first sintered member can be performed further steadily in the manufacturing process of the slider body.

Since the bonded area of the first sintered member and the second sintered member can be larger according to the depth of the first and the second recessed portions, adhesion strength of the both members can be further enhanced. Furthermore, since lower end portions of the first and the second attaching post portions of the second sintered member are fitted into the first and the second recessed portions of the first sintered member, respectively, the second sintered member can be firmly and strongly fixed to the first sintered member. Moreover, the first and the second recessed portions of the first sintered member may be used as receivers of the adhesive agent, for example, when the adhesive agent is applied to the first and the second protruding portions of the first sintered member. This can prevent the adhesive agent from spreading on the top surface of the upper blade plate, thereby preventing deterioration of appearance of the slider due to protruding adhesive agent.

In the embodiment of the invention, the lower end portion of the first attaching post portion of the second sintered member is formed such that a length in the longitudinal direction from a rear end of the first fitting hole portion to a rear edge of the first attaching post portion is longer than a length in the longitudinal direction from a front end of the first fitting hole portion to a front edge of the first attaching post portion. This allows for securing a further larger bonded area of the first attaching post portion of the second sintered member and the upper blade plate of the first sintered member without deteriorating appearance of the slider body, thereby allowing the first attaching post portion of the second sintered member to be further strongly fixed to the first sintered member.

In this case especially, adhesion strength of the first attaching post portion of the second sintered member with respect to the first sintered member can be easily enhanced as compared to adhesion strength of the second attaching post portion of the second sintered member. With a slide fastener, usually a slider is pulled with a larger force when the slider is slid in a direction to engage the element rows on the right and left (direction to close the fastener) than when the slider is slid in a direction to separate the element rows on the right and left (direction to open the fastener). In the tab attaching portion of the slider body, therefore, the first attaching post portion disposed on the end portion on the shoulder opening side of the slider body is likely to be applied with greater force when the slider is slid than the second attaching post portion disposed on the end portion on the rear opening side of the slider body.

When the such a unique way how the force is applied to the slider in the slide fastener is considered, by enhancing adhesion strength in the first attaching post portion of the second sintered member forming the tab attaching portion than adhesion strength in the second attaching post portion in the above manner, the tab attaching portion of the slider body (second sintered member) can be effectively avoided from coming off the upper blade plate (first sintered member) upon use of the slide fastener, thereby allowing for enhancing strength or durability of the slider.

In the invention, the first recessed portion on the upper blade plate is extended to an edge on the shoulder opening side of the upper blade plate and opened at the edge on the shoulder opening side of the upper blade plate. The second recessed portion on the upper blade plate is extended to an edge on the rear opening side of the upper blade plate and opened at the edge on the rear opening side of the upper blade plate. Therefore, a bottom surface of the first recessed portion and a bottom surface of the second recessed portion can be formed larger easily. This allows for securing a further larger bonded area of the first attaching post portion and the second attaching post portion of the second sintered member and the upper blade plate of the first sintered member, thereby allowing the second sintered member to be further strongly fixed to the first sintered member.

The first protruding portion of the upper blade plate includes at least one recessed groove portion recessed in a part of an outer peripheral surface of the first protruding portion. The second protruding portion of the upper blade plate includes at least one recessed groove portion recessed in a part of an outer peripheral surface of the second protruding portion. The recessed groove portion of the first protruding portion and the recessed groove portion of the second protruding portion are disposed in parallel or inclined with respect to the top surface of the upper blade plate. Therefore, when the second sintered member is bonded to the first sintered member, more adhesive agents can be held on the outer peripheral surface of the first protruding portion and the outer peripheral surface of the second protruding portion. This allows for further enhancing the adhesion strength of the first sintered member and the second sintered member.

Furthermore in the embodiment of the invention, an outer surface, of the second sintered member, exposed outside has a polished surface subjected to polishing processing while inner surfaces of the first fitting hole portion and the second fitting hole portion of the second sintered member have an unpolished surface having surface roughness greater than that of the polished surface, the unpolished surface not subjected to polishing processing (or subjected to less polishing processing).

Subjecting the outer surface of the second sintered member to polishing processing allows the tab attaching portion of the slider body to have more attractive gloss or luster. Meanwhile, for example, by intentionally not subjecting the inner surfaces of the first and the second fitting hole portions of the second sintered member which are to be bonded to the first sintered member to the polishing processing, a state of the surfaces can stay rough as compared to the outer surfaces of the second sintered member subjected to polishing processing, thereby allowing for effectively enhancing adhesion strength of the inner surfaces with respect to the first sintered member.

In the embodiment of the invention, a height of the first attaching post portion, disposed on the shoulder opening side of the second sintered member, from the upper blade plate is higher than a height of the second attaching post portion, disposed on the rear opening side, from the upper blade plate. The bridging portion of the tab attaching portion (second sintered member) is thus inclined upward toward the first attaching post portion with respect to the top surface of the upper blade plate when the second sintered member is bonded to the first sintered member and the slider body is thereby formed.

As a result of this, a shaft portion of the tab held by the tab attaching portion of the slider body can be smoothly moved toward the shoulder opening side, having high adhesion strength with respect to the upper blade plate, of the tab attaching portion when the slider of the slide fastener is slid in the direction to engage the element rows on the right and left to each other. Therefore, the tab attaching portion of the slider body is unlikely to be separated from the upper blade plate upon use of the slide fastener.

In the slider of the embodiment of the invention, an upper base portion of the guide post connecting with the upper blade plate is provided with an upper blade side bulging portion connecting, by a curved surface curving in a concave manner, the peripheral surface of the guide post and an element guiding surface of the upper blade plate. A lower base portion of the guide post connecting with the lower blade plate is further provided with a lower blade side bulging portion connecting, by a curved surface curving in a concave manner, the peripheral surface of the guide post and an element guiding surface of the lower blade plate.

In the case of slider bodies made of metal or synthetic resin of the related art, because of easiness in manufacturing of a mold and other reasons, connecting part of a guide post and an upper blade plate and a lower blade plate is formed into edge forms bended substantially in L-letter shapes such that lines are formed along boundaries between the guide post and the upper blade plate and the lower blade plate. In the slider formed by the sintered bodies containing zirconia of the embodiment of the invention, however, if an edge portion of a line shape is formed along boundaries between the guide post and the upper blade plate and the lower blade plate as in the slider bodies of the related art, stress is likely to be focused on the edge portion upon use of the slider, which may be an origin to cause brittle fracture of the slider body.

On the other hand, as described above, by providing, at the upper and lower base portions of the guide post, the upper blade side bulging portion and the lower blade side bulging portion connecting, by the curved surface curving in a concave manner, the peripheral surface of the guide post and the element guiding surface of the upper blade plate and the element guiding surface of the lower blade plate, respectively, an origin (the edge portion) of a bended shape likely to cause brittle fracture along the boundaries between the guide post and the upper blade plate and the lower blade plate can be eliminated. This can suppress breakage or fracture of the slider body, thereby allowing strength of the slider body to be enhanced.

In the slider of the embodiment of the invention, a tab pulling strength (slider total strength), which is the maximum strength where no breakage, fracture, or other damage occurs when the tab is pulled in a direction perpendicular to the top surface of the upper blade plate, is 120 Nor more, more preferably, 180 N or more. A tab twisting strength, which is the maximum strength where no breakage, separation, or other damage occurs when the tab is held perpendicular to the top surface of the upper blade plate and thereby twisted, is 70 N·cm or more, more preferably, 80 N·cm or more. The slider made of the ceramic sintered body having such a tab pulling strength and a tab twisting strength is of a good quality and can sufficiently endure normal use of a slide fastener.

BRIEF DESCRIPTION OF DRAWINGS

FIG. 9 is an exploded side view of the slider body;

DESCRIPTION OF EMBODIMENT

A detailed description will be hereinafter given of preferable embodiments of the invention with consultation of drawings. Incidentally, the invention is not limited to the embodiments described below in any way and may incorporate various modifications as long as the modification has substantially the same configuration as that of the invention and achieves similar effects thereto.

For example in the following embodiments, the case where the slider of the embodiment of the invention is formed as a slider in a slide fastener where element rows are formed by a plurality of continued fastener elements made of synthetic resin in a coil form. However, the invention may be applied similarly to a slider used in other slide fasteners having different forms of element rows such as slide fasteners where element rows are formed by injection molding of a plurality of independent fastener elements onto fastener tapes.

Figure 1:
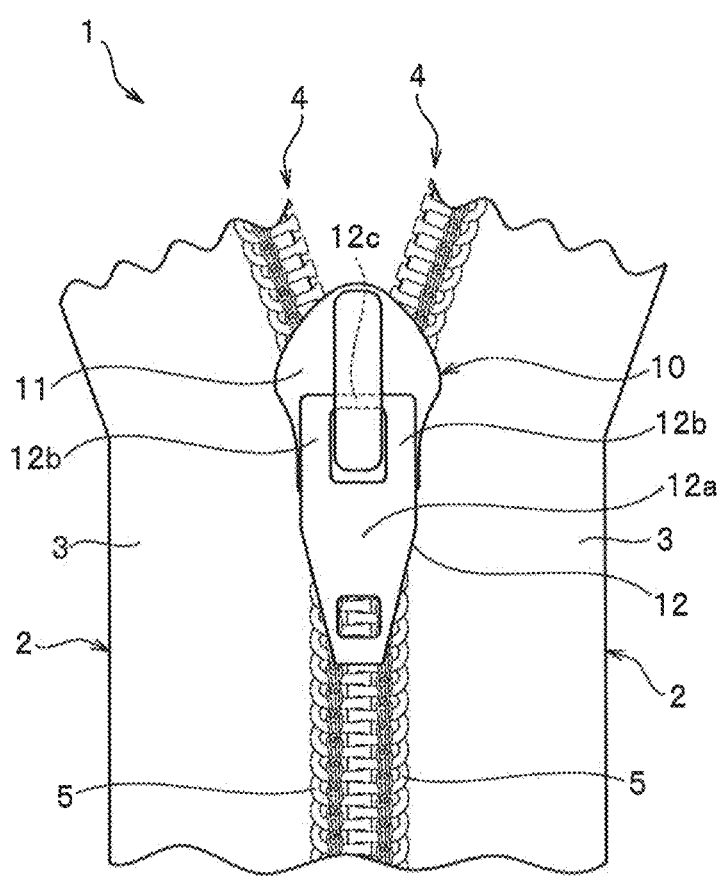
FIG. 1 is a plan view showing a slide fastener having a slider according to an embodiment of the invention.
Figure 2:
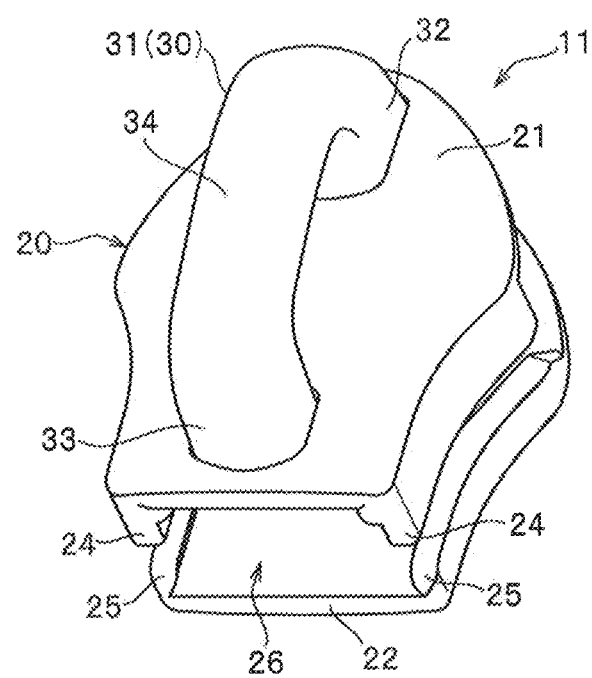
FIG. 2 is a perspective view of a slider body of the slider seen obliquely from a rear upper side.
Figure 3:
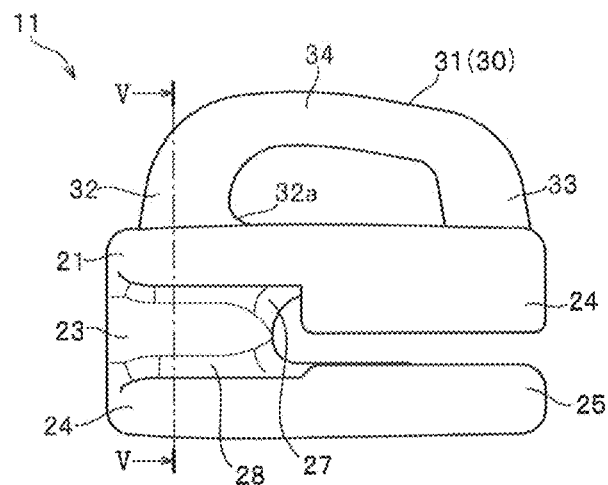
FIG. 3 is a side view of the slider body seen from a left side.
Figure 4:
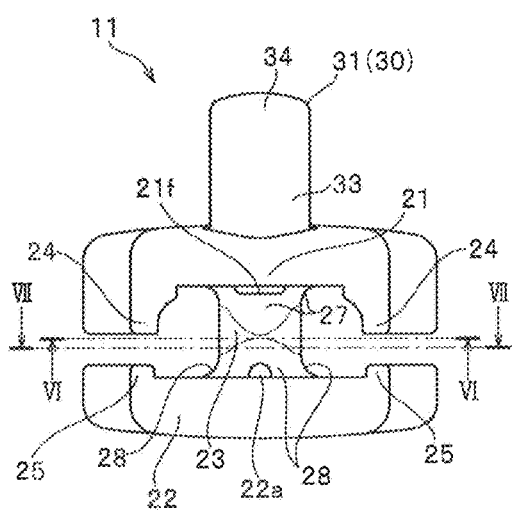
FIG. 4 is a rear view of the slider body.
Figure 5:
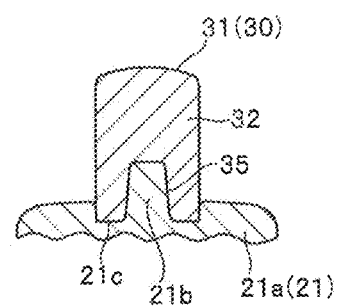
FIG. 5 is a cross-sectional view taken along a line V-V shown in FIG. 3.
Figure 6:
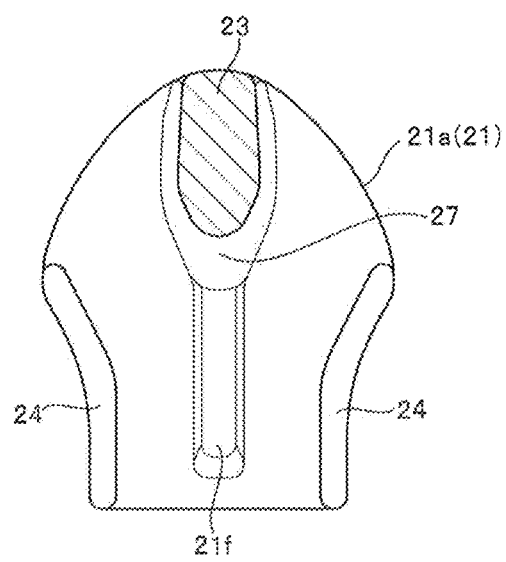
FIG. 6 is a cross-sectional view taken along a line VI-VI shown in FIG. 4.
Figure 7:
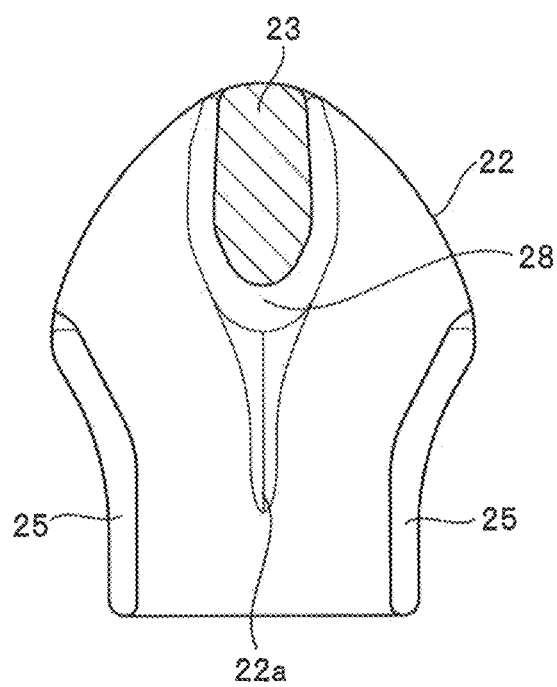
FIG. 7 is a cross-sectional view taken along a line VII-VII shown in FIG. 4.
Figure 8:
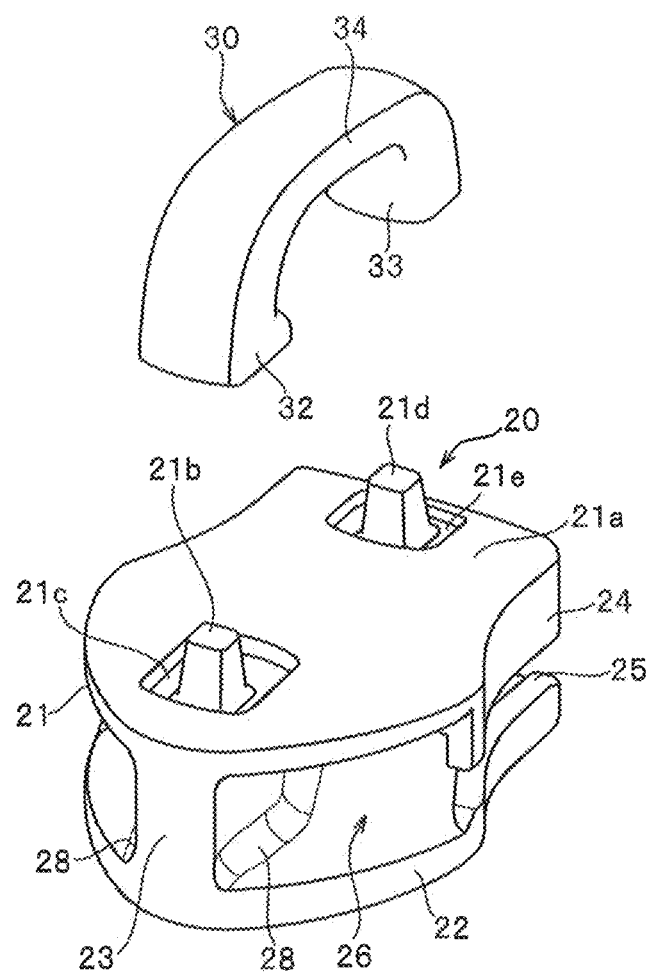
FIG. 8 is an exploded perspective view where the slider body is exploded into a first sintered member and a second sintered member.
Figure 10:
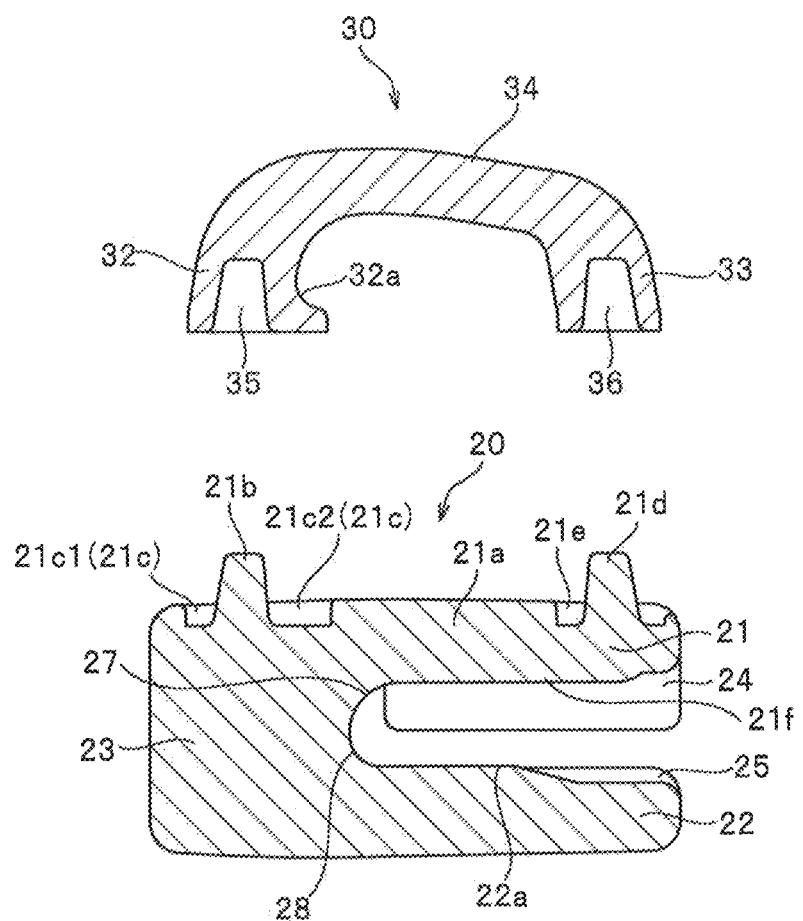
FIG. 10 is an exploded cross-sectional view of the slider body.

FIG. 1 is a plan view showing a slide fastener having a slider according to an embodiment of the invention. FIGS. 2 to 4 are a perspective view, a side view, and a rear view, respectively, of a slider body of the slider. FIGS. 5 to 7 are cross-sectional views of the slider body.

Incidentally, in the descriptions below, a sliding direction of the slider is defined as the longitudinal direction. Specifically, a direction in which the slider moves to engage the element rows of the slide fastener (direction to close the slide fastener) is defined as being oriented in the front (shoulder opening side direction) while a direction in which the slider moves to separate the element rows (direction to open the slide fastener) is defined as being oriented in the rear (rear opening side direction).

Furthermore, a height direction of the slider is defined as the vertical direction. A direction toward aside exposed outside when the slide fastener is used (for example a side where the tab is attached to the slider body) is defined as being oriented in the upper side while a direction in the opposite side is defined as being oriented in the lower side.

A direction which is perpendicular to the sliding direction of the slider and is in a width direction of the slider is defined as the horizontal direction.

A slider 10 of the present embodiment includes a slider body 11 and a tab 12 rotatably held by the slider body 11. The tab 12 includes a tab body 12a serving as a pinching portion, right and left arm portions 12b extending from the tab body 12a, and an shaft portion 12c linearly connecting tip portions of the right and the left arm portions 12b and held by the slider body 11.

The slider 10 of the present embodiment is used in a slide fastener 1 as illustrated in FIG. 1. This slide fastener 1 includes a pair of fastener stringers 2 on the right and left. Each of the fastener stringers 2 includes a woven fastener tape 3 of a thin belt shape and an element row 4 formed along a side edge of the tape opposite to the fastener tape 3. The element row 4 is formed by a plurality of continued fastener elements 5 where a monofilament is formed into a coil form.

The slider body 11 and the tab 12 of the present embodiment are formed by sintered bodies containing zirconia as a main component. In this case, each of the sintered bodies of the slider body 11 and the tab 12 may contain materials solid-soluble to zirconia such as rare earth oxides such as $Y_2O_3$ and CaO and MgO in addition to zirconia ($ZrO_2$) which is a main component. Dissolving a material such as $Y_2O_3$ in zirconia allows for enhancing mechanical characteristics such as strength or brittleness of the sintered bodies. When the slider body 11 and the tab 12 are to be in a desired color, the sintered bodies may contain a pigment. Note that "containing zirconia as a main component" means that, as described above, zirconia is contained by a ratio larger than 50% cubic volume. In the present embodiment 1, it is preferable that zirconia is contained in the sintered bodies by a ratio of 80% cubic volume or more.

The slider body 11 of the present embodiment is formed by two member of a first sintered member 20 and a second sintered member 30 bonded to each other by an adhesive agent. These first and the second sintered members 20 and 30 and the tab 12 are produced by, as will be described below, subjecting raw material powder containing zirconium oxide as a main component to injection molding and thereby forming a molded body and then sintering the obtained molded body at a predetermined sintering temperature. Incidentally, in the invention, a material and the shape of the tab 12 used in the slider 10 are not specifically limited and may vary as desired according to usage of the slide fastener 1 or other purposes.

The slider body 11 of the present embodiment includes an upper blade plate 21, a lower blade plate 22 disposed substantially in parallel to the upper blade plate 21, a guide post 23 connecting a front end portion (end portion on the shoulder opening side) of the upper blade plate 21 and a front end portion (end portion on the shoulder opening side) of the lower blade plate 22, a tab attaching portion 31, disposed integrally with the top surface of the upper blade plate 21, to hold the tab 12, right and left flange portions 24, disposed vertically along right and left side edge portions of the upper blade plate 21, to limit positions of the element rows 4 inside the slider body 11, and right and left projecting portions 25 provided in a projecting manner along right and left side edge portions of the lower blade plate 22.

The front end portion of the slider body 11 is formed with shoulder openings on the right and left interposing the guide post 23 therebetween while a rear end portion of the slider body 11 is formed with a rear opening. Furthermore, an element guiding path 26 of substantially a Y-letter shape is formed, such that the right and left shoulder openings and the rear opening are communicated, surrounded by the upper blade plate 21, the lower blade plate 22, the right and left flange portions 24, and the right and left projecting portions 25. At the right and left side edge portions of the slider body 11, tape insertion spaces to insert the fastener tapes 3 of the slide fastener 1 are formed between the right and left flange portions 24 and the right and left projecting portions 25, respectively.

The slider body 11 of the present embodiment includes the first sintered member 20 including the upper blade plate 21, the lower blade plate 22, the guide post 23, the right and left flange portions 24, and the right and left projecting portions 25 and the second sintered member 30 fixed to the first sintered member 20 via an adhesive agent and forming the tab attaching portion 31 as illustrated in FIGS. 8 to 12.

In this case, an epoxy-based adhesive agent of a two-liquid mixing type is used as the adhesive agent bonding the first sintered member 20 and the second sintered member 30. This adhesive agent is cured by heat generated by chemical reaction and thereby causes the first sintered member 20 and the second sintered member 30 to be bonded to each other. Note that an adhesive agent used in an embodiment of the invention is not specifically limited. Other adhesive agents may be used as long as the adhesive agent can cause the first sintered member 20 and the second sintered member 30 each formed by the sintered body containing zirconia as a main component to be bonded to each other.

The upper blade plate 21 of the first sintered member 20 includes an upper blade main body portion 21a, a first protruding portion 21b provided in a protruding manner on the front end portion on the shoulder opening side of the upper blade main body portion 21a, a first recessed portion 21c included around the periphery of the first protruding portion 21b, a second protruding portion 21d provided in an protruding manner on the rear end portion on the rear opening side of the upper blade main body portion 21a, a second recessed portion 21e included around the periphery of the second protruding portion 21d, and an upper partition portion 21f provided on a lower surface (element guiding surface) of the upper blade main body portion H as illustrated in FIGS. 8 to 12.

The first protruding portion 21b and the second protruding portion 21d of the upper blade plate 21 are provided as in a truncated quadrangular pyramid shape on the top surface of the upper blade main body portion 21a in a protruding manner. Outer surfaces of each of the first and the second protruding portions 21b and 21d include a front surface, a rear surface, right and left side surfaces, and an upper end surface. Such outer surfaces of the first and the second protruding portions 21b and 21d are in contact with inner surfaces of first and second fitting hole portions 35 and 36 (front, rear, right and left inner wall surfaces and bottom surfaces of the fitting hole portions) of the second sintered member 30, which will be described later, via the adhesive agent without any space therebetween when the second sintered member 30 is bonded to the first sintered member 20.

Note that in an embodiment of the invention, the shape of the first and the second protruding portions 21b and 21d is not limited to the aforementioned truncated quadrangular pyramid. The first and the second protruding portions 21b and 21d may be formed into a truncated pyramid shape, a cone shape, a polygonal pillar shape, or a column shape other than the truncated quadrangular pyramid shape.

The first recessed portion 21c and the second recessed portion 21e of the upper blade plate 21 are included around the entire peripheries of the first protruding portion 21b and the second protruding portion 21d, respectively, in a continued manner on the top surface of the upper blade main body portion 21a while encircling the first protruding portion 21b and the second protruding portion 21d, respectively. In these first and the second recessed portions 21c and 21e, lower end portions of the first and the second attaching post portions 32 and 33, which will be described later, of the second sintered member 30 are respectively inserted.

In this case, the depth from the top surface of the upper blade main body portion 21a to a bottom surface of the first recessed portion 21c and the depth from the top surface of the upper blade main body portion 21a to a bottom surface of the second recessed portion 21e are set at the same size. In the present embodiment, the depth of the first and the second recessed portions 21c and 21e is set within 0.1 mm to 10 mm. Note that in an embodiment of the invention, the depth of the first recessed portion 21c and the depth of the second recessed portion 21e may be set at different sizes.

Figure 11:
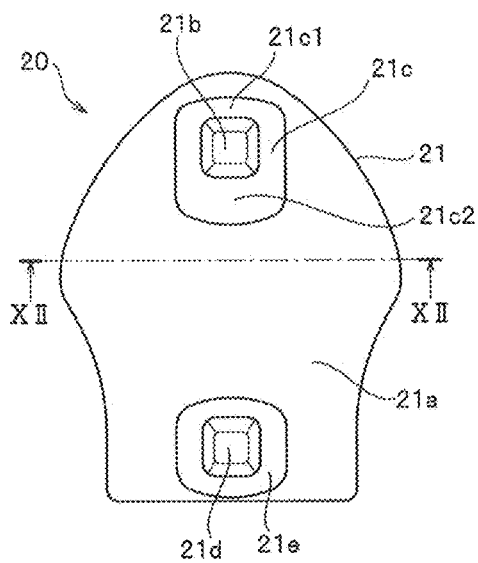
FIG. 11 is a plan view of the first sintered member.
Figure 12:
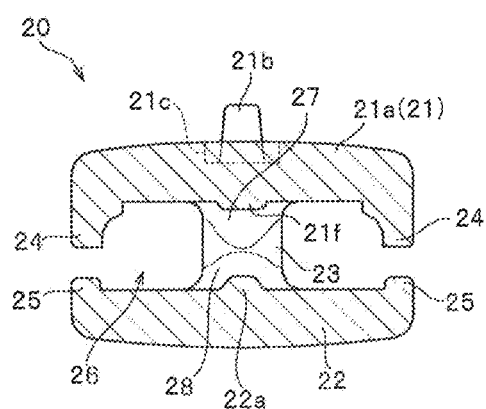
FIG. 12 is a cross-sectional view taken along a line XII-XII shown in FIG. 11.
Figure 13:
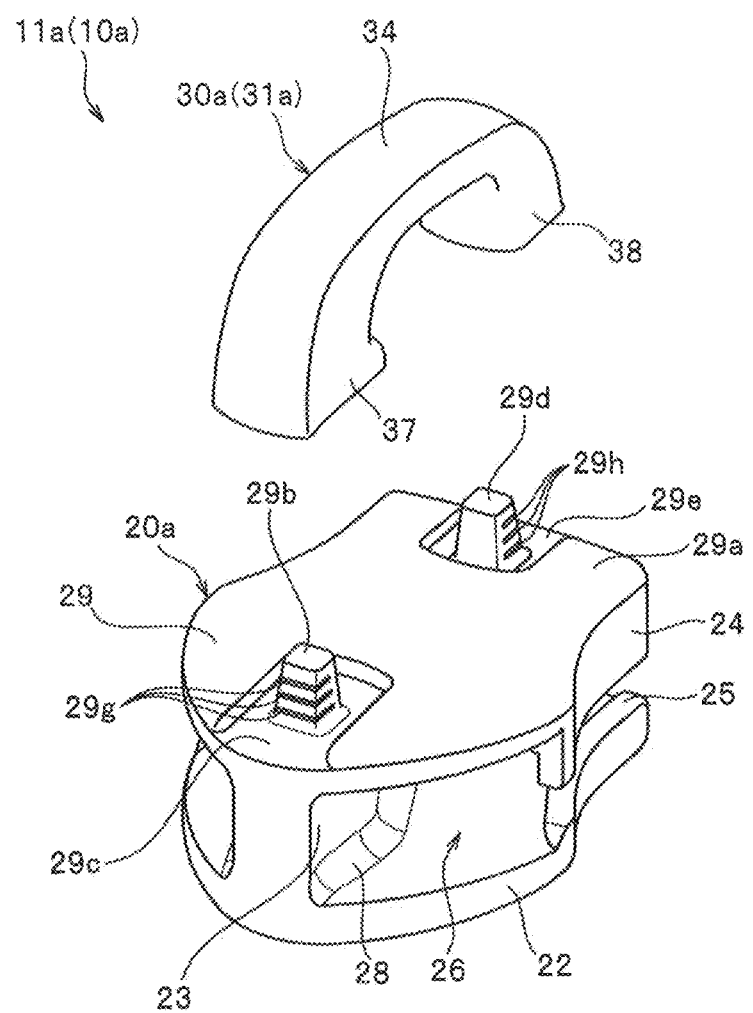
FIG. 13 is an exploded perspective view where the slider body according to the modification example is exploded into the first sintered member and the second sintered member.
Figure 14:
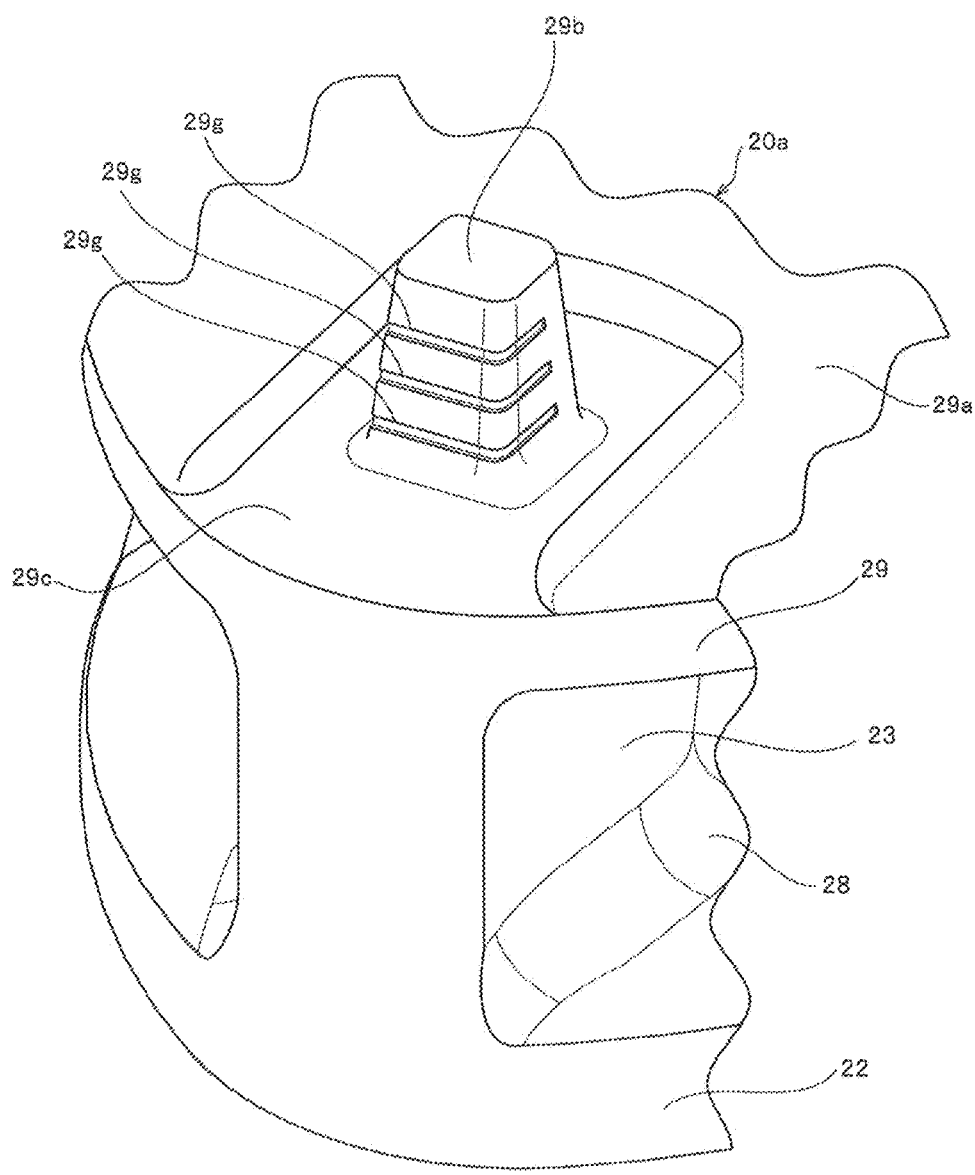
FIG. 14 is an enlarged perspective view of a main part showing a part of the sintered member of the slider body according to the modification example.
Figure 15:
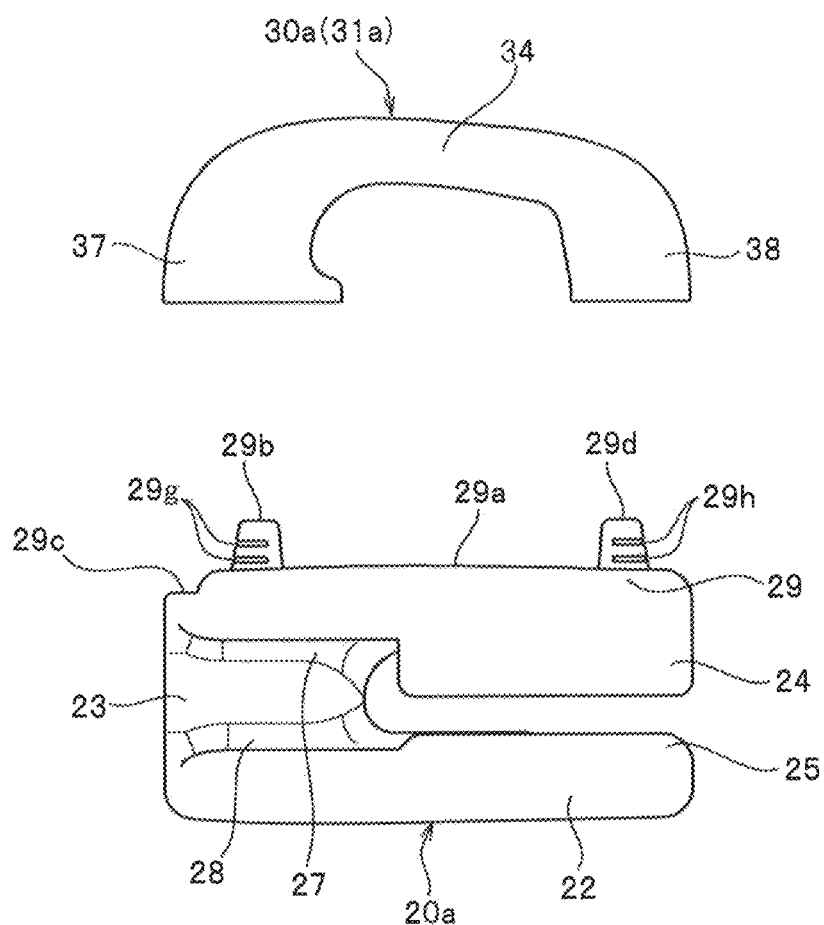
FIG. 15 is an exploded side view of the slider body according to the modification example.
Figure 16:
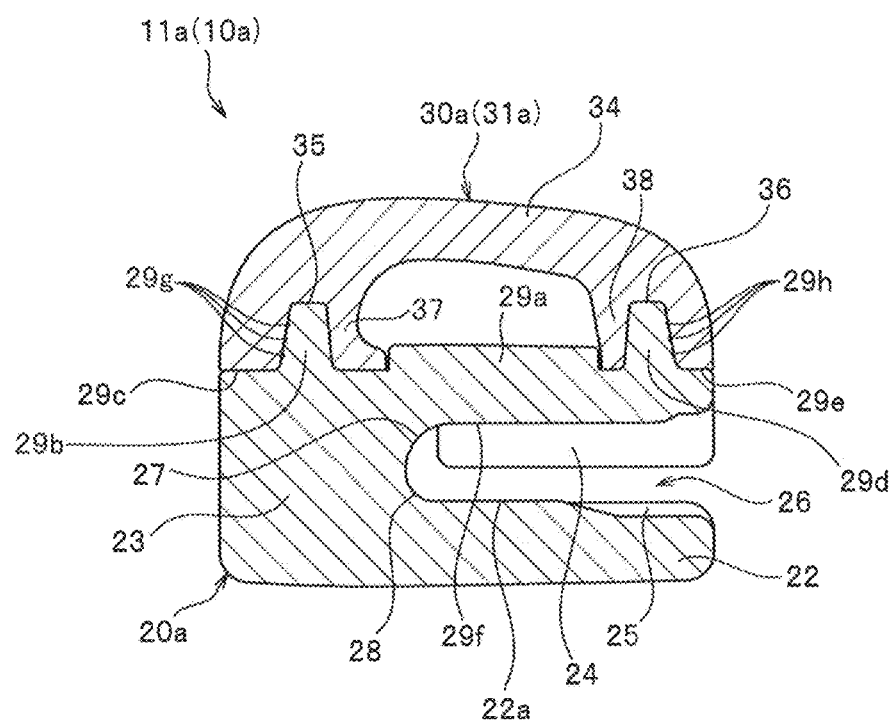
FIG. 16 is a cross-sectional view of the slider body according to the modification example.

The first recessed portion 21c and the second recessed portion 21e are formed to represent substantially a rectangular shape in a plan view (FIG. 11). The first recessed portion 21c is formed to have a bottom surface with a wider area than that of the second recessed portion 21e. Note that the bottom surfaces of the first and the second recessed portions 21c and 21e are formed into a shape and a size that correspond to the lower surfaces of the first and the second attaching post portions 32 and 33 of the second sintered member 30, respectively.

The first recessed portion 21c of the present embodiment includes a front end recessed portion 21c1 disposed in front of the first protruding portion 21b in the lateral direction, a rear end recessed portion 21c2 disposed behind of the second protruding portion 21d in the lateral direction, and right and left side recessed portions disposed on right and left sides of the first protruding portion 21b and connecting the front end recessed portion 21c1 and the rear end recessed portion 21c2. The second recessed portion 21e also includes a front end recessed portion, a rear end recessed portion, and right and left side recessed portions in a similar manner.

The first recessed portion 21c is formed such that the length of the rear end recessed portion 21c2 in the longitudinal direction is longer than the length of the front end recessed portion 21c1 in the longitudinal direction. The right and left side recessed portions of the first recessed portion 21c are formed symmetrically to have the same size. Meanwhile in the second recessed portion 21e, a front end recessed portion and a rear end recessed portion are formed symmetrically in the longitudinal direction to have the same size and right and left side recessed portions are formed symmetrically in the lateral direction to have the same size.

The first and the second recessed portions 21c and 21e of the present embodiment are formed around the entire peripheries of the first and the second protruding portions 21b and 21d in a continued manner as described above. However, in an embodiment of the invention, the first and the second recessed portions 21c and 21e may be included only in a partial area of the entire peripheries of the first and the second protruding portions 21b and 21d. In this case, the first and the second attaching post portions 32 and 33 of the second sintered member 30, which will be described later, have to be formed into forms corresponding to the shape of the first and the second recessed portions 21c and 21e.

The upper partition portion 21f of the upper blade plate 21 of the present embodiment extends from the guide post 23 toward the rear side in the central portion in the width direction of the upper blade main body portion 21a in such a manner as to bulge downward from the lower surface (element guiding surface) of the upper blade main body portion 21*a* as illustrated in FIG. 6. Providing this upper partition portion 21*f* allows for limiting the fastener elements 5 inserted in the element guiding path 26 of the slider body 11 and thereby correctly maintaining posture of the fastener elements 5 in the element guiding path 26. This allows for performing engagement and separation of the right and the left fastener elements 5 in the element guiding path 26 more smoothly.

As illustrated in FIGS. 3, 4, 6, and 8, an upper base portion of the guidepost 23 which is a connecting part of the lower surface of the upper blade plate 21 (element guiding surfaces of the upper blade main body portion 21*a* and the upper partition portion 21*f*) and the guide post 23 is provided with an upper blade side bulging portion 27 physically bulging. This upper blade side bulging portion 27 has a concave curved surface connecting the peripheral surface of the guide post 23 and the element guiding surface of the upper blade plate 21 in a continued manner in order to avoid formation of an edge portion of a line shape where stress is likely to be focused at the boundary between the guide post 23 and the upper blade plate 21.

Especially in the present embodiment, the upper blade side bulging portion 27 having the concave curved surface is formed in a continued manner on the whole peripheral surface of the guide post 23 excluding a front surface exposed outside, that is, a range from a front end of a left side surface to a front end of a right side surface via a rear surface of the peripheral surface of the guide post 23. Since such an upper blade side bulging portion 27 is provided, an edge portion of a bended shape which serves as an origin to cause brittle fracture is not formed at the boundary between the guide post 23 and the upper blade plate 21, thereby contributing to enhancement of strength of the slider body 11.

A top surface of the lower blade plate 22 (element guiding surface) of the present embodiment is provided with a lower partition portion 22*a* of extending from the guide post 23 toward the rear side in the central portion in the width direction of the lower blade plate 22 as illustrated in FIG. 7. As illustrated in FIGS. 3, 4, 7, and 8, a lower base portion of the guide post 23 which is a connecting part of the lower blade plate 22 and the guide post 23 is provided with a lower blade side bulging portion 28 having a concave curved surface.

Like the upper blade side bulging portion 27, the lower blade side bulging portion 28 is formed in a continued manner on the whole peripheral surface of the guide post 23 excluding a front surface exposed outside. This lower blade side bulging portion 28 connects the peripheral surface of the guide post 23 and the element guiding surface of the lower blade plate 22 by the concave surface in a continued manner in order to avoid formation of an edge portion of a bended shape which serves as an origin of brittle fracture at the boundary between the guide post 23 and the lower blade plate 22.

In this case, it is preferable that the curved surface of the upper blade side bulging portion 27 and the curved surface of the lower blade side bulging portion 28 included in the slider body 11 have a radius of curvature within a range of 0.5 mm to 0.8 mm (to a limit of mold parting). The curved surfaces having such a radius of curvature allow the peripheral surface of the guide post 23 and the element guiding surfaces of the upper blade plate 21 and the lower blade plate 22 to be continued surfaces smoothly connected via the upper blade side bulging portion 27 and the lower blade side bulging portion 28. This allows brittle fracture to be unlikely to occur at the boundary between the guide post 23 and the upper blade plate 21 and the lower blade plate 22.

The second sintered member 30 of the present embodiment is combined with the first sintered member 20 and fixed thereto by an adhesive agent, thereby forming the tab attaching portion 31 of the slider body 11. This second sintered member 30 is formed to represent a form of a gate shape in a side view of the slider body 11. The second sintered member 30 includes a first attaching post portion 32 provided in a projecting manner to the end portion on the shoulder opening side of the upper blade plate 21, a second attaching post portion 33 provided in a projecting manner to the end portion on the rear opening side of the upper blade plate 21, and a bridging portion 34 bridged between upper end portions of the first and the second attaching post portions 32 and 33 when fixed to the first sintered member 20.

The first attaching post portion 32 of the second sintered member 30 is provided with a first fitting hole portion 35 recessed upward from the lower surface of the first attaching post portion 32. The second attaching post portion 33 of the second sintered member 30 is provided with a second fitting hole portion 36 recessed upward from the lower surface of the second attaching post portion 33. These first fitting hole portion 35 and the second fitting hole portion 36 cover the first protruding portion 21*b* and the second protruding portion 21*d*, respectively, when the second sintered member 30 is combined with the first sintered member 20 with the first protruding portion 21*b* and the second protruding portion 21*d* of the first sintered member 20 fitted therein, respectively.

The first fitting hole portion 35 and the second fitting hole portion 36 have hole shapes corresponding to the truncated quadrangular pyramid shapes of the first protruding portion 21*b* and the second protruding portion 21*d*, respectively. Therefore, when the first protruding portion 21*b* and the second protruding portion 21*d* are fitted into the first fitting hole portion 35 and the second fitting hole portion 36, respectively, the front, rear, right and left inner wall surfaces and the hole bottom surfaces of the first fitting hole portion 35 and the second fitting hole portion 36 are in contact with the outer surfaces of the first protruding portion 21*b* and the second protruding portion 21*d*, respectively, via the adhesive agent without a space therebetween.

The outer surfaces of the second sintered member 30 exposed outside are subjected to polishing process upon production of the second sintered member 30 as will be described below and thus are formed to be polished smooth surfaces. Meanwhile, the respective inner wall surfaces and the hole bottom surfaces of the first fitting hole portion 35 and the second fitting hole portion 36 of the second sintered member 30 are formed to be unpolished surfaces having larger surface roughness as compared to the outer surfaces of the second sintered member 30 by selecting, as appropriate, the size of a polishing material used and thereby extremely reducing the polishing processing. In this case, it is preferable that the respective inner wall surfaces and the hole bottom surfaces of the first fitting hole portion 35 and the second fitting hole portion 36 of the second sintered member 30 are not polished at all.

The outer surfaces of the second sintered member 30 subjected to polishing processing can have gloss or luster unique to ceramics. Meanwhile, by forming the respective inner wall surfaces and the hole bottom surfaces of the first fitting hole portion 35 and the second fitting hole portion 36 to have large surface roughness, adhesion strength of the first and the second fitting hole portions 35 and 36 of the second sintered member 30 with the first and the second protruding portions 21b and 21d of the first sintered member 20 can be effectively enhanced when the second sintered member 30 is bonded to the first sintered member 20.

In the present embodiment, when the second sintered member 30 is combined with the first sintered member 20, the first attaching post portion 32 is fitted into the first recessed portion 21c while the second attaching post portion 33 is fitted into the second recessed portion 21e. Here, the shapes of the lower end portions of the first attaching post portion 32 and the second attaching post portion 33 in a bottom view of the second sintered member 30 are formed to correspond to the shapes of the first recessed portion 21c and the second recessed portion 21e in a plan view of the first sintered member 20, respectively.

That is, the lower end portion of the first attaching post portion 32 of the present embodiment (especially, the lower surface opposite to the bottom surface of the first recessed portion 21c) is formed such that the length in the longitudinal direction from the rear end of the first fitting hole portion 35 to the rear edge of the first attaching post portion 32 is longer than the length in the longitudinal direction from the front end of the first fitting hole portion 35 to a front edge of the first attaching post portion 32. This allows for easily enlarging the bonded area between the first attaching post portion 32 of the second sintered member 30 and the upper blade plate 21 of the first sintered member 20, thereby enhancing adhesion strength of the second sintered member 30 with respect to the first sintered member 20.

As described above, usually the tab 12 is pulled with a larger force when the slider 10 is slid forward to engage the element rows 4 on the right and left than when the slider 10 is slid backward in the opposite direction. Therefore, the bonded area between the first attaching post portion 32 of the second sintered member 30 and the upper blade plate 21 can be secured to be larger than the bonded area between the second attaching post portion 33 and the upper blade plate 21 as described above when the second sintered member 30 is bonded to the first sintered member 20. This can be effectively enhance strength of the slider 10 according to the unique way how the force is applied to the slider 10, thereby allowing the second sintered member 30 to be unlikely to be separated from the first sintered member 20 upon use of the slide fastener 1.

In this case, especially a rear wall surface 32a of the first attaching post portion 32 opposite to the second attaching post portion 33 is formed into a curved surface representing a curved shape in a side view of the slider body 11. The rear wall surface 32a of the first attaching post portion 32 formed into a curved surface shape is unlikely to disturb easy movement (easy rotation) of the tab 12 with respect to the tab attaching portion 31 of the slider body 11. This does not deteriorate appearance of the slider body 11 while allowing for easily securing the length of the lower surface of the first attaching post portion 32 behind the first fitting hole portion 35 to be long and thereby enhancing adhesion strength of the first attaching post portion 32 with respect to the upper blade plate 21.

Meanwhile, a front wall surface of the second attaching post portion 33 opposite to the first attaching post portion 32 is not formed into a curved surface as that of the rear wall surface 32a of the first attaching post portion 32 in a side view of the slider body 11. The front wall surface of the second attaching post portion 33 is inclined such a manner as to be away from the rear wall surface 32a of the first attaching post portion 32 as it extends downward. Such a configuration allows the tab 12 to be easily operated without being disturbed.

In the second sintered member 30 of the present embodiment, the height of the first attaching post portion 32 from the upper blade plate 21 in the vertical direction is higher than the height of the second attaching post portion 33 from the upper blade plate 21 in the vertical direction. The bridging portion 34 is inclined upward with respect to the top surface of the upper blade plate 21.

This allows for proactively encouraging the shaft portion 12c of the tab 12 to move toward the shoulder opening side of the tab attaching portion 31 when the tab 12 is pulled up. The first attaching post portion 32 side of the tab attaching portion 31 has a large adhesion strength of the tab attaching portion 31 and the slider body 11 as described above. As a result of this, separation of the tab attaching portion 31 of the slider body 11 from the upper blade plate 21 can be further effectively suppressed upon use of the slide fastener 1.

The guide post 23 is disposed along the axis of the first attaching post portion 32 in the vertical direction. As a result of this, force applied in a direction to separate the upper blade plate 21 and the lower blade plate 22 of the slider body 11 can be reduced upon use of the slide fastener 1, thereby effectively suppressing fracture of the slider 10.

Next, a method of manufacturing the slider 10 of the aforementioned present embodiment will be described.

When the slider 10 of the present embodiment is manufactured, the first sintered member 20 and the second sintered member 30 of the slider body 11 and the tab 12 are produced. Note that although the first sintered member 20, the second sintered member 30, and the tab 12 have different shapes from each other, a material and the method of producing are substantially similar. Therefore, the method of producing the sintered bodies will be described mainly with the first sintered member 20.

The first sintered member 20 of the present embodiment is formed by a sintered body containing zirconia as a main component as described above. Therefore, in order to produce the sintered body of the first sintered member 20, raw material powder of the sintered body is first prepared. The raw material powder of the first sintered member 20 mainly contains zirconia powder. For enhancing mechanical characteristics such as strength or brittleness of the sintered bodies, the raw material powder may contain powder of materials solid-soluble to zirconia such as rare earth oxides such as $Y_2O_3$ and CaO and MgO in addition to zirconia powder. When the first sintered member 20 is to be in a desired color, the raw material powder may contain a pigment of the desired color.

After the raw material powder is prepared as appropriate, an organic binder is mixed well with the obtained raw material powder to produce a molding raw material. The organic binder is a solvent to provide firmness or binding property to the raw material powder. Organic binders containing, for example, polyvinyl alcohol or methyl cellulose as a main component are used. As the molding raw material is produced, a mold for molding the first sintered member 20 is prepared.

Next, injection molding is performed using the produced molding raw material. In this injection molding process, the molding raw material is filled in a cavity of the mold with injection pressure applied thereto and thereby molded into a shape corresponding to the shape of the first sintered member 20.

In this case, as injection conditions, the temperature of the mold is set within a range of 40 to 50° C. for example. The pressure is held at 50+/−10 MPa for a time duration of 2+/−0.1 seconds. Note that the molded body subjected to injection molding here is formed into a larger size than the actual first sintered member 20 since the molded body shrinks in subsequent degreasing process and sintering process.

After performing injection molding, the obtained molded body is placed inside a degreasing furnace to perform the degreasing process. By performing this degreasing process, the organic binder component contained in the molded body is thermally decomposed at a high temperature and thereby removed. Note that processing conditions of the degreasing processing are selected as appropriate depending on the type or amount of the organic binder contained in the molded body.

After the degreasing process, the degreased molded body is placed inside a sintering furnace to perform sintering process to sinter the molded body. Note that the degreasing process and the sintering process can be performed continuously in a single heating furnace.

In this sintering process, as sintering conditions, the sintering temperature is set at 1300° C. or more, preferably around 1500° C. while sintering time duration is set within a range of 40 to 50 hours. Performing such a sintering process results in obtaining the sintered body of the first sintered member 20 having the shape as illustrated in FIGS. 8 to 12. Incidentally, in an embodiment of the present invention, conditions of the injection molding process, the degreasing process, and the sintering process are not specifically limited and may be set as desired.

After the sintering process is performed, polishing process to perform barrel polishing processing on the obtained sintered body is performed. In this polishing process, the sintered body (first sintered member 20), polishing stones (pumice stones or ceramic beads), and a polishing agent are placed inside a polishing barrel called a barrel and mixed for a long time, thereby performing polishing processing on surfaces of the sintered body. Performing such a polishing process allows the surfaces (especially, outer surfaces exposed outside) of the sintered body (first sintered member 20) to represent gloss or luster unique to ceramics.

In the case of the sintered body of the second sintered member 30 of the present embodiment, for example by using polishing stones larger than the size of the openings of the first and the second fitting hole portions 35 and 36 included in the second sintered member 30 as the polishing stones placed in the polishing barrel together with the sintered body in the polishing process, the outer surfaces of the second sintered member 30 can be finished as polished surfaces having gloss or luster after polishing processing while the inner side (inner wall surfaces and the hole bottom surface) of the first and the second fitting hole portions 35 and 36 of the second sintered member 30 can be intentionally not subjected to polishing processing (or less polishing processing) and thereby the inner side can be kept unpolished having larger surface roughness than that of the outer surfaces.

The first sintered member 20 and the second sintered member 30 of the slider body 11 and the tab 12 are separately produced by performing the aforementioned preparation of the raw material powder to the polishing process.

Thereafter, an assembling process to assemble the slider 10 by using the produced first sintered member 20, the second sintered member 30, and the tab 12 one by one is performed.

In this assembling process, first, the first sintered member 20 is held horizontal to the upper blade plate 21 and in this state the whole first protruding portion 21b and the second protruding portion 21d in the first sintered member 20 and the entire inner walls of the first recessed portion 21c and the second recessed portion 21e are applied with an epoxy-based adhesive agent. Here, since the upper blade plate 21 of the first sintered member 20 is formed with the first recessed portion 21c and the second recessed portion 21e, overflow of the adhesive agent onto the top surface of the upper blade plate 21 can be prevented. This prevents the applied adhesive agent from spreading on the top surface of the upper blade plate 21 and thereby prevents deterioration of appearance of the slider 10.

Subsequently, the tab 12 is placed on the upper blade plate 21 of the first sintered member 20 applied with the adhesive agent at a predetermined position with a predetermined orientation. In this state, furthermore the second sintered member 30 is attached to the upper blade plate 21 of the first sintered member 20.

In the present embodiment, here the first sintered member 20 includes the first protruding portion 21b, the second protruding portion 21d, the first recessed portion 21c, and the second recessed portion 21e while the second sintered member 30 includes the first fitting hole portion 35 and the second fitting hole portion 36. This allows for securing the large bonded area between the first sintered member 20 and the second sintered member 30, thereby allowing the second sintered member 30 to be strongly and firmly bonded to the first sintered member 20.

Performing the aforementioned processes results in manufacturing of the slider 10 of the present embodiment as illustrated in FIG. 1.

In the slider 10 of the present embodiment manufactured in the above manner, the element guiding path 26 formed between the upper blade plate 21 and the lower blade plate 22 of the slider body 11 has substantially the same shape as that of an element guiding path 26 of a general slider 10 in the related art and thus stably has the essential function of the slider 10 to smoothly separate and engage the element rows 4 on the right and left.

The slider body 11 and the tab 12 in the slider 10 of the present embodiment are formed by sintered bodies containing, as a main component, zirconia having high fracture toughness and strong bending strength among ceramic materials and thus have high shock-resistance. Therefore, breakage or fracture is unlikely to occur upon use of the slide fastener 1.

The slider 10 of the present embodiment especially has a tab pulling strength (slider total strength) of 120 N or more, preferably, 180 N or more and a tab twisting strength of 70 N·cm or more, preferably, 80 N·cm. Therefore, with the slider 10 of the present embodiment, sliding operation to pull the tab 12 can be stably and repeatedly performed in the slide fastener 1.

Moreover, since the slider body 11 of the present embodiment is formed by a ceramic sintered body, the inner surface of the element guiding path 26 (element guiding surface) is formed to be hard and smooth. This allows friction resistance of the slider 10 with respect to the element rows 4 to be smaller than that of a slider made of metal or a slider made of synthetic resin of the related art for example, thereby enhancing slidability of the slider 10.

The slider 10 of the present embodiment further has gloss or luster unique to zirconia sintered bodies which cannot be obtained with a slider made of metal or a slider made of synthetic resin of the related art and thus has sophisticated appearance or texture as well as superior friction resistance, durability, and heat resistance as compared to a slider made of metal or a slider made of synthetic resin of the related art.

In the embodiments described above, the slider body 11 is formed by bonding the first sintered member 20 and the second sintered member 30 with the adhesive agent. In an embodiment of the present invention, however, for example when a tab having a structure to allow an opening window portion thereof to insert a tab attaching portion of a slider body to open or close as desired is used, a molded body where the tab attaching portion is integrated with an upper blade plate may be produced in the injection molding process and, by performing the degreasing process and the sintering process on the molded body, the slider body may be formed as a single zirconia sintered body without using an adhesive agent.

A description will be given of a slider according to a modification example of the embodiment mentioned above with reference to FIG. 13-FIG. 16. Incidentally, in a slider 10a according to this modification example, a shape of an upper blade plate 29 of a first sintered member 20a and a tab attaching portion 31a (a second sintered member 30a) is different from the slider 10 according to the above embodiment, while a shape of other members or parts and materials of the first sintered member 20a and the second sintered member 30a are same as the slider 10 according to the above mentioned embodiment. Therefore, in a description and drawings of the slider 10a according to the modification example, a detailed description will be omitted by expressing with the same numerals for the members or parts having substantially the same configuration with the slider 10 according to the above mentioned embodiment.

The slider 10a according to the modification example includes a slider body 11a and a tab (not illustrated), same as the above mentioned embodiment, held by the slider body 11a. The slider body 11a includes a first sintered member 20a including an upper blade plate 29, a lower blade plate 22, a guide post 23, right and left flange portions 24 and right and left projecting portions 25, and a second sintered member 30a forming a tab attaching portion 31a. The slider body 11a is formed by bonding these two parts of the first sintered member 20a and the second sintered member 30a mutually with adhesive agent.

The upper blade plate 29 according to the modification example includes an upper blade main body portion 29a, a first protruding portion 29b provided in a protruding manner on the front end portion on the shoulder opening side of the upper blade main body portion 29a, a first recessed portion 29c recessed in the periphery of the first protruding portion 29b, a second protruding portion 29d provided in an protruding manner on the rear end portion on the rear opening side of the upper blade main body portion 29a, a second recessed portion 29e recessed in the periphery of the second protruding portion 29d, and an upper partition portion 29f provided on a lower surface (element guiding surface) of the upper blade main body portion 29a.

The first protruding portion 29b and the second protruding portion 29d of the upper blade plate 29 are provided as in a truncated quadrangular pyramid shape on the top surface of the upper blade main body portion 29a in a protruding manner. Recessed groove portions 29g, 29h are provided on outer surfaces of the first protruding portion 29b and the second protruding portion 29d. Specifically, as the outer surfaces of the first protruding portion 29b and the second protruding portion 29d, an outer peripheral surface including a front surface, a rear surface, and right and left side surfaces, and an upper end surface formed via a ridge line with respect to the outer peripheral surface are disposed. The first protruding portion 29b has three recessed groove portions 29g recessed continuously on three surfaces of the front surface and the right and left side surfaces out of the outer peripheral surface. The second protruding portion 29d has three recessed groove portions 29h recessed continuously on three surfaces of the rear surface and the right and left side surfaces out of the outer peripheral surface.

The three recessed groove portions 29g, 29h provided respectively on the first protruding portion 29b and the second protruding portion 29d are disposed in parallel to the top surface of the upper blade plate with a predetermined interval each other. In the present invention, a shape of the recessed groove portions 29g, 29h can be changed arbitrarily. A number of the recessed groove portions 29g, 29h provided on the first protruding portion 29b and the second protruding portion 29d is not limited and can be changed arbitrary. Furthermore, as long as a plurality of recessed groove portions formed on the first protruding portion 29b or the second protruding portion 29d are disposed in parallel each other, a direction of the recessed groove portion can be set in an inclined direction with respect to the top surface of the upper blade plate.

Since the three recessed groove portions 29g, 29h are respectively provided on the first protruding portion 29b and the second protruding section 29d, more adhesive agents can be held on the outer peripheral surface of the first protruding portion 29b and the second protruding portion 29d. Therefore, the adhesion strength of the first sintered member 20a and the second sintered member 30a can be further enhanced.

In this case, each recessed groove portion 29g, 29h provided on the first protruding portion 29b and the second protruding portion 29d is not provided on all outer peripheral surface of the front surface, the rear surface and the right and left side surfaces, but only provided on the above mentioned three surfaces excluding opposed surfaces in which the first protruding portion 29b and the second protruding portion 29d out of the outer peripheral surface oppose each other. The recessed groove portions 29g, 29h are provided on a part of the outer peripheral surface of the first protruding portion 29b and second protruding portion 29d and a flat surface in which the recessed groove portions 29g, 29h are not formed is provided at least one surface of the outer peripheral surface, thereby the deterioration of the strength of the first protruding portion 29b and the second protruding portion 29d due to the formation of the recessed groove portions 29g, 29h can be suppressed, and the strength of the first protruding portion 29b and the second protruding portion 29d can be stably secured appropriately.

The first recessed portion 29c and the second recessed portion 29e of the upper blade plate 29 are formed on a top surface of the upper blade main body portion 29a continuing a whole circumference of the first protruding portion 29b and the second protruding portion 29d so as to surround a lower end portion of the first protruding portion 29b and a lower end portion of the second protruding portion 29d respectively. The first recessed portion 29c in this modification example is extended to the front edge of the upper blade main body portion 29a so as to be opened at the front edge of the upper main body portion 29a. The front edge of the first recessed portion 29c has a shape in which a dimension in a slider width direction is gradually increasing toward the front of the upper blade main body portion 29a.

The second recessed portion 29e is extended to the rear edge of the upper blade main body portion 29a so as to be opened at the rear edge of the upper main body portion 29a.

The rear end portion of the second recessed portion 29e has a shape in which a dimension in a slider width direction is gradually increasing toward the rear of the upper blade main body portion 29a. A depth dimension from the top surface of the upper blade main body portion 29a to bottom surfaces of the first recessed portion 29c and the second recessed portion 29e is set be the same as the above mentioned embodiment.

The second sintered member 30a (tab attaching portion 31a) in the modification example includes a first attaching post portion 37 provided in a projecting manner to the end portion on the shoulder opening side of the upper blade plate 29, a second attaching post portion 38 provided in a projecting manner to the end portion on the rear opening side of the upper blade plate 29, and a bridging portion 34 bridged between upper end portions of the first attaching post portion 37 and the second attaching post portion 38. In the first attaching post portion 37 and the second attaching post portion 38, a first fitting hole portion 35 and a second fitting hole portion 36 included upward from a lower surface of the first attaching post portion 37 in a recessed manner, are respectively provided with a same shape and dimension as the above mentioned embodiment.

The lower end portions of the first attaching post portion 37 and the second attaching post portion 38 are formed to be fitted to the first recessed portion 29c and the second recessed portion 29e of the first sintered member 20a, respectively. In the lower end portion of the first attaching post portion 37 and the second attaching post portion 38, a length dimension in a longitudinal direction from a front end of the first fitting hole portion 35 to a front edge of the first attaching post portion 37 and a length dimension in a longitudinal direction from a rear end of the second fitting hole portion 36 to a rear edge of the second attaching post portion 38 are set to be a length dimension of each corresponding portion of the first recessed portion 29c and the second recessed portion 29e. Therefore, these length dimensions in the modification example are set to be larger than that of the slider 10 of the above mentioned embodiment.

The front end portion of the lower end portion in the first attaching post portion 37 has a shape in which a dimension in a slider width direction is gradually increasing toward the front so as to correspond to a shape of the first recessed portion 29c. The rear end portion of the lower end portion in the second attaching post portion 38 has a shape in which a dimension in a slider width direction is gradually increasing toward the rear so as to correspond to a shape of the second recessed portion 29e.

In the modification example, since the first recessed portion 29c and the second recessed portion 29e of the first sintered member 20a and the first attaching post portion 37 and the second attaching post portion 38 of the second sintered member 30a are formed as mentioned above, a bonded area of the first attaching post portion 37 and the second attaching post portion 38 of the second sintered member 30a and the upper blade plate 29 of the first sintered member 20a is secured larger than that of the above mentioned embodiment.

Since the slider 10a of this modification example includes a different shape as above from the slider 10 according to the above embodiment, the adhesion strength of the second sintered member 30a to the first sintered member 20a can be further enhanced. Therefore, a tab pulling strength (slider total strength) and a tab twisting strength of the slider 10a can be further enhanced.

REFERENCE SIGNS LIST

1 Slide fastener
2 Fastener stringer
3 Fastener tape
4 Element row
5 Fastener element
10,10a Slider
11,11a Slider body
12 Tab
12a Tab body
12b Arm portion
12c Shaft portion
20,20a First sintered member
21 Upper blade plate
21a Upper blade main body portion
21b First protruding portion
21c First recessed portion
21c1 Front end recessed portion
21c2 Rear end recessed portion
21d Second protruding portion
21e Second recessed portion
21f Upper partition portion
22 Lower blade plate
22a Lower partition portion
23 Guide post
24 Flange portion
25 Projecting portion
26 Element guiding path
27 Upper blade side bulging portion
28 Lower blade side bulging portion
29 Upper blade plate
29a Upper blade main body portion
29b First protruding portion
29c First recessed portion
29d Second protruding portion
29e Second recessed portion
29f Upper partition portion
29g,29h Recessed groove portion
30,30a Second sintered member
31,31a Tab attaching portion
32 First attaching post portion
32a Rear wall surface
33 Second attaching post portion
34 Bridging portion
35 First fitting hole portion
36 Second fitting hole portion
37 First attaching post portion
38 Second attaching post portion

The invention claimed is:
1. A slider for a slide fastener, the slider including:
a slider body where an upper blade plate and a lower blade plate are connected by a guide post and a tab attaching portion is disposed on a top surface of the upper blade plate; and
a tab held by the tab attaching portion,
wherein the slider body is formed by a sintered body containing zirconium oxide as a main component,
wherein the slider body includes a first sintered member including the upper blade plate, the lower blade plate, and the guide post and a second sintered member which forms the tab attaching portion and is formed separately from the first sintered member,
the second sintered member is fixed to the first sintered member via an adhesive agent wherein the second sintered member includes a first attaching post portion fixed to a shoulder opening side on a top surface of the upper blade plate, a second attaching post portion fixed to a rear opening side on the top surface of the upper blade plate, and a bridging portion bridged between upper end portions of the first and the second attaching post portions, the upper blade plate includes a first protruding portion protruding from an end portion on the shoulder opening side on the top surface of the upper blade plate and a second protruding portion protruding from an end portion on the rear opening side on the top surface of the upper blade plate, and the second sintered member includes a first fitting hole portion to fit the first protruding portion therein, the first fitting hole portion being included on a lower surface of the first attaching post portion in a recessed manner, and a second fitting hole portion to fit the second protruding portion therein, the second fitting hole portion being included on a lower surface of the second attaching post portion in a recessed manner.

2. The slider according to claim 1, wherein at least a part of a periphery of the first protruding portion on the top surface of the upper blade plate includes, in a recessed manner, a first recessed portion to fit a lower end portion of the first attaching post portion therein and at least a part of a periphery of the second protruding portion includes, in a recessed manner, a second recessed portion to fit a lower end portion of the second attaching post portion therein.

3. The slider according to claim 2, wherein the first recessed portion and the second recessed portion are included around the entire peripheries of the first protruding portion and the second protruding portion, respectively, in a continued manner.

4. The slider according to claim 2, wherein the lower end portion of the first attaching post portion is formed such that a length in a longitudinal direction from a rear end of the first fitting hole portion to a rear edge of the first attaching post portion is longer than a length in a longitudinal direction from a front end of the first fitting hole portion to a front edge of the first attaching post portion.

5. The slider according to claim 2, wherein the first recessed portion is extended to an edge on the shoulder opening side of the upper blade plate and opened at the edge on the shoulder opening side of the upper blade plate, and the second recessed portion is extended to an edge on the rear opening side of the upper blade plate and opened at the edge on the rear opening side of the upper blade plate.

6. The slider according to claim 1, wherein the first protruding portion of the upper blade plate includes at least one recessed groove portion recessed in a part of an outer peripheral surface of the first protruding portion, and the second protruding portion of the upper blade plate includes at least one recessed groove portion recessed in a part of an outer peripheral surface of the second protruding portion.

7. The slider according to claim 6, wherein the recessed groove portion of the first protruding portion is disposed in parallel or inclined with respect to the top surface of the upper blade plate, and the recessed groove portion of the second protruding portion is disposed in parallel or inclined with respect to the top surface of the upper blade plate.

8. The slider according to claim 1, wherein an outer surface, of the second sintered member, exposed outside has a polished surface subjected to polishing processing while inner wall surfaces of the first and the second fitting hole portions of the second sintered member has an unpolished surface having surface roughness greater than that of the polished surface.

9. The slider according to claim 1, wherein a height of the first attaching post portion of the second sintered member from the upper blade plate is higher than a height of the second attaching post portion from the upper blade plate, and the bridging portion is inclined upward toward the first attaching post portion with respect to the top surface of the upper blade plate.

10. The slider according to claim 1, wherein an upper base portion of the guide post connecting with the upper blade plate is provided with an upper blade side bulging portion connecting, by a curved surface curving in a concave manner, the peripheral surface of the guide post and an element guiding surface of the upper blade plate, and a lower base portion of the guide post connecting with the lower blade plate is provided with a lower blade side bulging portion connecting, by a curved surface curving in a concave manner, the peripheral surface of the guide post and an element guiding surface of the lower blade plate.

11. The slider according to claim 1, wherein a tab pulling strength when the tab is pulled in a direction perpendicular to the top surface of the upper blade plate is 120 N or more and a tab twisting strength when the tab is held perpendicular to the top surface of the upper blade plate and twisted is 70 N cm or more.

* * * * *

UNITED STATES PATENT AND TRADEMARK OFFICE
CERTIFICATE OF CORRECTION

| | |
|---|---|
| PATENT NO. | : 10,085,525 B2 |
| APPLICATION NO. | : 15/371438 |
| DATED | : October 2, 2018 |
| INVENTOR(S) | : Toru Yabuya et al. |

It is certified that error appears in the above-identified patent and that said Letters Patent is hereby corrected as shown below:

In the Specification

In Column 1, Line 22, delete "guidepost" and insert -- guide post --, therefor.

In Column 1, Line 34, delete "terephtalate" and insert -- terephthalate --, therefor.

In Column 13, Line 12, delete "guidepost" and insert -- guide post --, therefor.

Signed and Sealed this
Twenty-sixth Day of February, 2019

Andrei Iancu
*Director of the United States Patent and Trademark Office*